US012534404B2

(12) United States Patent
Dostal et al.

(10) Patent No.: US 12,534,404 B2
(45) Date of Patent: Jan. 27, 2026

(54) MINERAL BINDER BASED CONSTRUCTION MATERIAL WITH IMPROVED FIRE RESISTANCE BEHAVIOR

(71) Applicant: KNAUF GIPS KG, Iphofen (DE)

(72) Inventors: Peter Dostal, Markt Einersheim (DE); David Weigand, Ochsenfurt (DE)

(73) Assignee: KNAUF GIPS KG, Iphofen (DE)

(*) Notice: Subject to any disclaimer, the term of this patent is extended or adjusted under 35 U.S.C. 154(b) by 339 days.

(21) Appl. No.: 18/252,304

(22) PCT Filed: Nov. 23, 2020

(86) PCT No.: PCT/EP2020/000201
§ 371 (c)(1),
(2) Date: May 9, 2023

(87) PCT Pub. No.: WO2022/105981
PCT Pub. Date: May 27, 2022

(65) Prior Publication Data
US 2024/0010557 A1 Jan. 11, 2024

(51) Int. Cl.
| C04B 14/42 | (2006.01) |
| C04B 14/06 | (2006.01) |
| C04B 20/04 | (2006.01) |
| C04B 28/14 | (2006.01) |
| C04B 103/63 | (2006.01) |
| C04B 111/00 | (2006.01) |
| C04B 111/28 | (2006.01) |
| C04B 111/34 | (2006.01) |

(52) U.S. Cl.
CPC ........... *C04B 14/42* (2013.01); *C04B 14/062* (2013.01); *C04B 20/04* (2013.01); *C04B 28/14* (2013.01); *C04B 2103/63* (2013.01); *C04B 2111/0062* (2013.01); *C04B 2111/28* (2013.01); *C04B 2111/34* (2013.01)

(58) Field of Classification Search
CPC ....... C04B 14/42; C04B 14/062; C04B 20/04; C04B 28/14; C04B 2103/63; C04B 2111/0062; C04B 2111/28; C04B 2111/34; C04B 28/12; C04B 28/001; C04B 28/02
See application file for complete search history.

(56) References Cited

U.S. PATENT DOCUMENTS

| 5,064,785 A | * | 11/1991 | Kawamoto | ........... C03C 13/002 |
| | | | | 501/72 |
| 5,340,612 A | | 8/1994 | Perito | |
| 7,776,170 B2 | | 8/2010 | Yu et al. | |
| 2007/0036973 A1 | | 2/2007 | Bruner et al. | |

FOREIGN PATENT DOCUMENTS

| CN | 101973752 A | | 2/2011 |
| CN | 102140027 A | | 8/2011 |
| CN | 104564113 A | * | 4/2015 |
| CS | 212212 B2 | * | 3/1982 |
| JP | 2014-228035 A | | 12/2014 |
| JP | 2019-189476 A | | 10/2019 |
| WO | 2017000972 A1 | | 1/2017 |
| WO | 2020125917 A1 | | 6/2020 |

OTHER PUBLICATIONS

International Search Report and Written Opinion received for PCT/EP2020/000201, mailed Aug. 23, 2021.
Matsushita Electric Works Ltd., "Inorganic building materials with high nonflammability and small dimensional shrinkage," Chemical Abstracts 98, No. 22, May 30, 1983, 1 page (p. 312).
Sadao, S., "Inorganic sheets with improved resistance to fire and chemicals," Chemical Abstracts 105, No. 14, Oct. 6, 1986, 1 page (p. 306).
Serard, L., "La Fibre Quartzel," 4533 Composites 31, No. 2, Mar./Apr. 1991, Paris, FR, pp. 139-142. (with English Translation).
Wallenberger, F., et al., "Glass Fibers," ASM Handbook, vol. 21: Composites, 2001, 9 pages.
Notification of Reasons for Refusal received for Japanese Appl No. 2023-524344, mailed Sep. 3, 2024.

* cited by examiner

*Primary Examiner* — Anthony J Green
(74) *Attorney, Agent, or Firm* — Greer, Burns & Crain, Ltd

(57) ABSTRACT

Mineral binder based construction materials are disclosed, including thermally pre-treated silicate glass fibers and colloidal silica and further additives, which have increased fire resistance such that they have a delayed shrinkage when exposed to high temperatures relative to a mineral binder based construction material with conventional glass fibers and colloidal silica, but otherwise of identical composition. The claimed mineral binder based construction materials provide an improved resistance towards rupture, thus ensuring that corresponding structures maintain their integrity for longer periods of time when exposed to fire. Also disclosed are methods for the production of mineral binder based construction materials and the use of thermally pre-treated silicate glass fibers and colloidal silica to effect a delay in shrinkage of mineral binder based construction materials, when exposed to elevated temperatures.

11 Claims, 2 Drawing Sheets

MINERAL BINDER BASED CONSTRUCTION MATERIAL WITH IMPROVED FIRE RESISTANCE BEHAVIOR

BACKGROUND

The invention concerns fire-resistant mineral binder based construction materials and a method for producing construction materials of this kind. In particular, the invention relates to mineral binder based construction boards, which have an increased fire resistance.

Mineral binder based construction materials such as those made of clays, cements and plasters are extremely common worldwide and are also known for their fire rating. Of these, gypsum is an important building commodity as evidenced by the hundreds of millions of square feet of gypsum-core wallboard manufactured and sold for use in the building industry every year. Gypsum wallboard, also commonly known as drywall, gypsum board, gypsum sheathing, and plasterboard, and other mineral binder based construction materials, such as fiber cement boards, must have certain basic properties in order to meet accepted industry standards. Some of these standards relate to fire resistance, that is, either the maximum temperature a material maintains its structural integrity and can endure without cracking or collapsing (losing its integrity) or the time it takes at a certain high temperature to burn through, collapse, or otherwise destroy the integrity of the material. These features are important in reducing fire propagation as well as harm to individuals. Fire resistance is to be distinguished from fire retardancy, which is the ability of a material to withstand high temperature for a certain amount of time without catching fire and burning.

Due to the water of crystallization contained especially in set gypsum ($CaSO_4 \times 2H_2O$), gypsum building materials have advantageous properties in the case of fire, as the water can evaporate from the gypsum to bind a great deal of the fire's energy. Since this is an endothermic process, the evaporation of the bound water causes the gypsum building material to cool. With increasing water evaporation, calcium sulfate hemihydrate ($CaSO_4 \times \frac{1}{2}H_2O$) is formed in a further step, which is later converted to calcium anhydrite ($CaSO_4$). However, a disadvantage of the liberation of water from the gypsum is that calcium sulfate hemihydrate or anhydrite occupy less volume than the calcium sulfate dihydrate precursor. In addition, the heating of the material leads to a further loss of volume, which causes the building material to shrink. Since gypsum boards are regularly applied to a metal stud framework, the shrunken boards can be released from their attachments. Individual parts of a drywall construction may drop from the drywall construction, which constitutes a risk of injury for individuals located in the rooms. In addition, cracks and gaps allow a fire to spread to the rear side of a drywall construction and further to adjacent rooms. Fiber cement boards face similar problems.

In the prior art, some attempts have been described which intend to delay or prevent the shrinking of mineral binder based, especially gypsum building materials, under the effect of strong heat (such as fire) over a longer period of time. For this purpose, e.g. fire resistant materials such as clays or fire expanding materials, such as vermiculites were incorporated into the building materials, which due to their expansion behavior on exposure to heat can at least partially compensate the volume shrinkage of the gypsum.

Conventional glass fibers are frequently incorporated to strengthen mineral binder based boards and make them more resilient towards rupture in the case of fire. Glass fibers facilitate the distribution of strains resulting from the shrinkage of the building material during high temperatures and thus delay both shrinking and breaking of corresponding mineral binder based products.

Conventional glass fibers are regularly not capable to withstand high temperatures beyond 900° C., which may occur in a fire. For example, most conventional glass fibers soften or melt around 700° C. to 1000° C., so that the conventional glass fibers can no longer provide their strengthening effect to the mineral binder based board at these high temperatures.

In general, there is also a demand for mineral binder based construction materials which have an increased fire resistance and which in particular at least significantly delay the time it takes a fire to break through to the rear side of a drywall construction.

The present applications provides a solution to these demands.

SUMMARY

A first aspect of the invention is a mineral binder based construction material, which comprises at least a mineral binder, silicate glass fibers and optionally further additives. The silicate glass fibers are thermally pre-treated fibers.

Mineral binders according to the invention comprise all particulate building materials that can physically or preferably chemically set when the mineral binder in dry/powder form is mixed with a fluid, for example water. Chemical setting involves a chemical reaction (e.g. hydration), while physical setting can be e.g. drying. Mineral binders can be calcium sulfate comprising binders as for example gypsum and also its partially dehydrated forms, i.e. α- or β-hemihydrate (e.g. stucco) or anhydrite. Mineral binders can also be or comprise lime, clay or cement binders (such as e.g. Portland cement, Portland cement blends, other kiln cements, calcium aluminates or sulfoaluminates, magnesia cement, magnesium oxychroide cement, belite cement) as well as combinations thereof. Mineral binders can be hydraulic binders (such as e.g. cement, pozzolans, hydraulic lime, calcium sulfate hemihydrate or anhydrite, calcium silicates, clinker, fly ash) or non-hydraulic binders (such as clay, non-hydraulic lime, waterglass). Hydraulic binders set by hydration, while non-hydraulic binders need exposure to e.g. carbon dioxide for hardening. Construction materials based on mineral binders can additionally comprise various additives that are known to person skilled in the art, e.g. fillers, accelerators, retarders, rheology modifying agents, hydrophobisationng agents, refractory materials, etc. Aside from setting, the process for the preparation of a mineral binder based construction material can additionally comprise a drying step.

In the case of a calcium sulfate as a mineral binder, the dehydrated forms (α- and β-hemihydrate and anhydrite) are hydrated in the presence of water. In this setting process, calcium sulfate dihydrate (i.e. gypsum) is formed. Calcium sulfate dihydrate crystals interlock and thus provide strength, while excess water still needs to evaporate for the complete hardening of the material.

The term "mineral binder based construction material" encompasses processable/formable mixtures comprising a mineral binder as well as set/solidified mixtures comprising a mineral binder. Set/solidified mixtures encompass the shaped bodies such as a building board (e.g. plasterboard or cement board), a brick, an installed render (e.g. an installed plaster), an installed mortar, an installed filler, an installed joint compound or an installed screed. Processable/formable mixtures encompass the not yet shaped bodies (i.e. powdered mixtures) such as render (e.g. a plaster), mortar, filler, joint compound or screed, the shaping of which is performed only by the optional addition of water and application to a surface.

The mineral binder may comprise at least 50 wt.-% calcium sulfate binder based on the total weight of the mineral binder. Calcium sulfate material exists as dihydrate ($CaSO_4 \times 2H_2O$, also referred to as gypsum), hemihydrate ($CaSO_4 \times \frac{1}{2} H_2O$; also referred to as stucco) or anhydrite ($CaSO_4$). Naturally occurring calcium sulfate material can be mined in any of the forms mentioned above. In the production of building boards, the largest amount of calcium sulfate binder is added as hemihydrate, which sets during the production process to form dihydrate in the finished building board. Dry, powdered compounds such as plaster, filler or joint compound are sold with the calcium sulfate binder being present in the form of anhydrite or hemihydrate. After being mixed with water, the calcium sulfate binder ultimately sets and forms dihydrate.

The term "silicate glass fibers" in this invention is meant to denote fibers, which primarily comprise silica ($SiO_2$) i.e. >80 wt.-% silica based on the total weight of the fiber, the silica preferably being amorphous.

The term "thermally pre-treated" in this invention is meant to denote that the silicate glass fibers underwent a temperature pre-treatment, i.e. a thermal pre-treatment, prior to mixing them with the mineral binder and water and prior to shaping a board or other construction material. Thermally pre-treated silicate glass fibers are typically manufactured for and used mainly in the metal and glass industries for thermal insulation e.g. in high temperature gaskets or insulation mats.

Preferably, a thermal pre-treatment of the pre-treated silicate glass fibers comprises the step of heating silicate glass fibers to temperatures between 700° C. to 1000° C., preferably 850° C. to 1000° C., for at least 30 min. More preferably, the thermal pre-treatment of the silicate glass fibers is maintained for 45 min to 420 min, most preferably the thermal pre-treatment of the silicate fibers is maintained for 200 min to 400 min.

In a preferred embodiment of the invention, the thermally pre-treated silicate glass fibers can comprise a combined amount of silica ($SiO_2$) and alumina ($Al_2O_3$) of at least 91 wt.-%, more preferably at least 95 wt.-% and even more preferably at least 98 wt.-%. In a particularly preferred embodiment, the thermally pre-treated silicate glass fibers comprise at least 90 wt.-%, especially 90 to 99 wt.-%, preferably 93 to 98 wt.-% of silica ($SiO_2$) and 1 to 10 wt.-%, preferably 2 to 7 wt.-% of alumina ($Al_2O_3$). The specified weight percentages in this case are based on the total weight of the fibers.

Alternatively, or in addition thereto, the thermally pre-treated silicate glass fibers in this invention can have a melting point of at least 1300° C., more preferably at least 1500° C. and even more preferably at least 1700° C.

Alternatively, or in addition thereto, the thermally pre-treated silicate glass fibers in this invention can have a softening point, of at least 1200° C., more preferably at least 1300° C., even more preferably at least 1500° C. and most preferably at least 1600° C. A relatively high softening point ensures the structural integrity of the fiber and, consequently, also warrants the stability of the building material up to this temperature. The softening point is the temperature at which there is a noticeable change in physical properties. The glass material will change from rigid to soft, but not yet melted.

Alternatively, or in addition thereto, the thermally pre-treated silicate glass fibers in this invention can be shrink resistant at high temperatures. High temperatures meaning the exposure to at least 700° C. and at most 1000° C., preferably at least 900° C. for at least 30 min. Specifically, the thermally pre-treated silicate glass fibers can contract, less than 7%, preferably less than 5%, more preferably less than or equal to 3%, most preferably less than or equal to 2% when exposed to temperatures of 1000° C. for at least 30 min. Contraction of the fibers is to be understood that the thermally pre-treated silicate glass fibers retain at least 93.1%, preferably at least 95.1%, more preferably at least 97%, most preferably at least 98% or their original length when exposed to the high temperatures of at least 700° C. and at most 1000° C., preferably at least 900° C., for at least 30 min. Minimal contraction is advantageous in that the described fibers are not released or disengaged from the binder matrix and can thus continue to provide stability and/or cohesion of the building material when the mineral binder based construction material is exposed to high temperatures, as for example temperatures that can be experienced during a fire. The term cohesion is meant to denote that no parts of the building material fall of flake off. Cohesion is further meant to denote that the fibers are capable of holding the matrix material together firmly and keep it united.

Alternatively, or in addition thereto, the thermally pre-treated silicate glass fibers in this invention can lose 2 wt. %-6 wt. %, when exposed to temperatures of 500° C. for 45 min to 75 min. Non pre-treated silicate glass fibers typically lose 9 wt. % to 13 wt. % and non-treated glass fibers, i.e. conventional glass fibers, can lose 0 wt. % to 3 wt. %, when exposed to temperatures of 500° C. for 45 min to 75 min. There generally is no further weight loss for non pre-treated and thermally pre-treated silicate glass fibers when exposed to 1000° C. for 45 min to 75 min, as the weight loss for these fibers is almost identical at 500° C. However, there generally is a 9 wt. % to 13 wt. % weight loss for conventional glass fibers at 1000° C. for 45 min to 75 min. Weight loss in this case is related the weight of the fibers at ambient temperature prior heating them to 500° C. for 45 min to 75 min.

Alternatively, or in addition thereto, thermally pre-treated silicate glass fibers in this invention can maintain their structural integrity and flexibility after being exposed to 1000° C. for 45 min to 75 min. Non-pre-treated silicate glass fibers can maintain their structural integrity after the same exposure, but can be brittle. At 1000° C. for 45 min to 75 min conventional glass fibers lose their structural integrity and form a molten clump.

Preferably, the thermally pre-treated silicate glass fibers have a low lung bio-persistence. A low lung bio-persistence means that the fibers are not considered a potential health hazard, especially on respiratory exposure.

DETAILED DESCRIPTION

The term "conventional glass fibers" is meant to denote glass fibers that comprise amorphous silica ($SiO_2$), preferably 50 to 70 wt. % amorphous $SiO_2$ based on the total weight of the fiber. Amorphous materials have no or extremely low (<3%) crystallinity or long-range order. More preferably the conventional glass fibers comprise 50 to 65 wt. % amorphous $SiO_2$, all based on the total weight of the fiber. Conventional glass fibers can further comprise $Al_2O_3$, $B_2O_3$, $CaO$, $MgO$ and/or other metal oxides. Conventional fibers generally have a melting point lower than 1000° C.

and/or a softening point lower than 900° C., preferably a softening point around 700° C.

The mineral binder based construction material can further comprise colloidal silica.

The term "colloidal silica", also known as silica sol, in the invention is intended to denote a suspension of fine amorphous, non-porous, and typically spherical silica particles in a liquid phase, wherein the colloidal silica particles typically have an average particle size in the range of about 1 to 50 nm.

The use of thermally pre-treated silicate glass fibers, optionally in combination with colloidal silica improves the fire resistance of mineral binder based construction materials as compared to mineral binder based construction materials that contain no thermally pre-treated silicate glass fibers, but are otherwise of identical composition. Since the combined use of thermally pre-treated silicate glass fibers and colloidal silica provides the best characteristics with regard to fire resistance, an embodiment of the inventive building materials comprising both thermally pre-treated silicate glass fibers and colloidal silica is preferred.

Fire resistance is meant to denote the ability of a system or component, such as e.g. a building structure or a building material, to withstand a fire or extremely high temperature. Extremely high temperature is a temperature exceeding 600° C., preferably exceeding 900° C. for at least 60 min., preferably for at least 120 min. Withstanding a fire or extremely high temperature is meant to denote that a material, e.g. a construction material, maintains its structural integrity and can endure without cracking or collapsing (losing its integrity). Withstanding a fire or extremely high temperature is further meant to denote that a material, e.g. a construction material, will not fail structurally or allow transit of the flames to the side away from the fire. The inventive building material is fire resistant and/or can withstand temperatures of at least 945° C. for at least 120 min, as tested with an exposure to a temperature according to the temperature profile of DIN EN 1363-1: 2012-10 for the first 60 min and at a constant 945° C. for the next 60 min. Within the scope of this invention, the length of time until the inventive construction material starts to shrink at defined temperature conditions and the time until the inventive construction material reaches a certain shrinkage rate at these temperature conditions is prolonged, thus providing more fire resistant construction materials and/or a more fire-resistant construction. The respective measurements to determine this delay in the invention were made according to and with an apparatus as described in WO 2017/000972 A1.

The apparatus WO 2017/000972 A1 can simultaneously and/or continuously determine the change in length of one sample and change in weight of another sample while heating. Since only the change in length is relevant to this invention, only this part of the apparatus will be described. A table-shaped sample holder is positioned in an oven chamber. Two cylinder shaped support members on stilts are positioned on the table-shaped holder. The sample rests on these cylinder shaped support members and is further supported by a counter bearing on one side. The two support members are shaped so as to provide a minimum contact area between such a support member and the sample. Cylinder shaped support members, which are arranged horizontally provide such a minimum contact area between the support member and the sample. Having a minimal contact area is preferred in order to reduce the friction between the sample and its support, i.e. the support members, while expanding or shrinking. This avoids measurement errors and allows for a smooth recording without sudden jumps in the data, which would be method related and not process related. The sample is fixed to this counter bearing, thereby limiting a change in length to the opposite side. The change in length can be measured on the side opposite to the counter bearing with a length measuring device. The length measuring device comprises a detector rod and a rod position sensor detecting and recording a change in the position of the detector rod along a longitudinal axis. The detector rod is of a heat-resistant material, e.g. a ceramic material, and has a detecting tip on one end, which contacts the first sample on the sample side opposite of the counter bearing. The detector rod extends from the position sensor on the outside of the chamber into the heat chamber. The detector rod is placed under pressure by a spring and is pressed against the side of the sample by the spring force. This allows for continuous measurements while heating the oven according to standard temperature-time curves.

If the mineral binder based construction material is a cement building material, shrinkage is not the main concern but the occurrence of uneven stresses within the cement article when exposed to fire. This can result in fractionation and flaking of the cement material. The thermally pre-treated silicate glass fibers prevent fall-off, i.e. larger pieces of the construction material from falling off the article. The cohesion of the article is increased by the fiber content. In case of cement wallboards or cement renders this is crucial to reduce injuries to individuals in burning homes. The discussed fall-off and cohesion are also relevant in other mineral binder based construction materials.

In case the mineral binder based construction material comprises calcium sulfate binder, the evaporation of water from $CaSO_4 \times 2H_2O$ leads to the formation of phases with a lower water content and smaller volume, specifically calcium sulfate hemihydrate or anhydrite. This change in volume can be detected, for example, by the determination of the length of a test sample body prior to and after a defined temperature treatment. After the temperature treatment, the length of the sample body is shorter. It has to be noted, however, that absolute values are of little significance in this context, since the shrinking rate of calcium sulfate building materials/products also depends on the origin of the calcium sulfate binder. It is common knowledge that calcium sulfate can contain different impurities depending on its origin and that these impurities can affect the properties of the building material. Thus, only calcium sulfate of identical origin can be compared directly. It is thought that the thermally pre-treated silicate fibers advantageously shrink less than comparable fibers with similar softening and/or melting points when exposed to high temperatures, as for example temperatures that can be experienced during a fire. With an improved ability to maintain their size (i.e. to shrink less), it is further thought that these fibers are not released or disengaged from the binder matrix and can continue to provide stability and/or cohesion of the building material, even under shrinkage stresses Before a sample test body starts to shrink when subjected to elevated temperatures, however, compact sample bodies generally expand to some extent. It is assumed that this expansion is associated with the release of the crystallization water from the gypsum ($CaSO_4 \times 2H_2O$), whereby water vapor is generated. The expansion phase starts with the heating of the sample body and ends at the time at which the sample body starts to shrink, i.e. starts to decrease in size or length.

The difference between the length of the sample body before the application of temperature and the length of the sample body after a defined temperature application of 120 min., is expressed in percent of the original length (=length before temperature application). Positive percentage values for the change in length denote an expansion (expansion rate), i.e. an increase in length, while negative percentage values denote a shrinkage (shrinkage rate), i.e. a reduction in length. The lower (i.e. the less negative) the shrinkage rate, the less the construction material shrinks as a result of the temperature treatment. The length of the sample body is the direction in space, in which the sample body has the largest extension. Without being bound by theory, it is believed that a building material or a sample body thereof can shrink in other dimensions (i.e. other directions), such as e.g. width or height, as well.

Both the duration of the time interval from the start of the high temperature treatment until the start of the shrinkage phase (i.e. the stage or time period in which the sample test body decreases in length), which in many cases coincides with the duration of the expansion phase (i.e. the stage or time period at the start of the high temperature treatment in which the sample test body increases in length), and the shrinkage rate are dependent on the sample size and the sample shape. If the sample test bodies are taken from a board produced on a production line, the orientation of the sample with respect to the production direction is also relevant. Thus, only samples of approximately the same shape, size, weight, and if applicable the same sample orientation should be compared with one another.

An important advantage resides in the fact that this construction material exhibits a temporally delayed shrinkage phase, i.e. the stage or time period in which the sample body decreases in length, relative to a mineral binder based construction material which contains conventional glass fibers instead of thermally pre-treated silicate glass fibers as well as optionally colloidal silica, and otherwise has an identical composition, when exposed to temperatures of at least 80° C. Especially in the case of calcium sulfate building material, it is important to understand that calcium sulfate building material dehydrates, when exposed to of temperatures of at least 80° C. This means that the $H_2O$ molecules that were incorporated into the crystalline calcium sulfate structure are removed gradually. A dihydrate will change into a hemihydrate and eventually an anhydrite. Calcium sulfate molecules with a lower water content also occupy less space. This in turn means, that the calcium sulfate building material can shrink.

In a preferred embodiment, the start of the shrinkage phase of the inventive construction material is delayed. The time interval, from the start of the high temperature treatment until a test body of the inventive construction material starts to shrink (=delay of the shrinkage) is longer than the time interval, at which a corresponding test body of essentially the same composition, which comprises conventional glass fibers (instead of thermally pre-treated silicate glass fibers) and optionally colloidal silica, starts to shrink when exposed to temperatures according to the standard temperature-time curve as described in DIN EN 1363-1: 2012-10 and the temperature was maintained at 945° C. from 60 min to 120 min. Preferably, the time interval for a test body to reach 99% of its initial length is at least 1.35 times the time interval, more preferable at least 1.5 times the time interval, and even more preferably at least 1.6 times the time interval, at which a test body with conventional glass fibers (instead of thermally pre-treated glass fibers) and optionally colloidal silica, but otherwise of identical composition reaches 99% of its initial length when exposed to temperatures according to the standard temperature-time curve as described in DIN EN 1363-1: 2012-10 and the temperature was maintained at 945° C. from 60 min to 120 min. For example, if a conventional test body starts to shrink at 10 min, an inventive test body having a delay in shrinkage of at least 1.5 times only starts to shrink at 15 min or later when exposed to the mentioned temperatures.

In order to attain comparable results the sample bodies of the mineral binder based construction materials according to the invention were subjected to a temperature treatment according to the standard temperature-time curve according to DIN EN 1363-1: 2012-10 for the first 60 min of the heating. On that basis, the furnace heating curve should satisfy the following equation:

$$T=345 \log_{10}(8t+1)+20$$

wherein
T is the average furnace temperature in degrees Celsius and t is the time elapsed in minutes. During the first 60 min the samples are heated to approximately 945° C. After this initial period, the temperature application according to the tests carried out deviated from DIN EN 1363-1: 2012-10: In the test runtime thereafter, i.e. from 60 min to 120 min, a constant temperature application of 945° C. was used.

A test body produced from a mineral binder with a composition according to an embodiment of the invention exhibits a smaller shrinkage rate after at least 60 min than a test body comprising conventional glass fibers and optionally colloidal silica, but otherwise of identical composition when exposed to a temperature according to the temperature profile of DIN EN 1363-1: 2012-10 for the first 60 min. Particularly, the shrinkage rate of a test body according to this embodiment is at least 10% lower (i.e. less negative), preferably at least 20% lower and more preferably at least 40% lower after at least 60 min than the shrinkage rate of a test body produced from a mineral binder with conventional glass fibers (instead of thermally pre-treated glass fibers), but otherwise of identical composition. Alternatively or in addition thereto, the shrinkage rate of a test body according to the embodiment can be at least 10% lower (i.e. less negative), preferably at least 20% lower and more preferably at least 40% lower after at least 120 min when the test body is subjected to standard temperature-time curve according to DIN EN 1363-1: 2012-10 for the first 60 min and a constant 945° C. in the 60 min thereafter, as mentioned above. As mentioned previously, the type of mineral binder based construction material, weight, size and orientation with respect to the production direction, where applicable, have to be comparable.

In a preferred embodiment of the invention, the inventive construction material comprises 0.01 to 5 wt.-%, preferably 0.05 to 2 wt.-%, more preferably 0.1 to 1.5 wt.-% of thermally pre-treated silicate glass fibers, based on the total weight of the mineral binder, used in the production of the building material. In this regard, it has been found that if the amount of thermally pre-treated silicate glass fibers is less than 0.01 wt.-%, the stabilization effect of the fibers on the composition to delay and/or reduce shrinkage may not be sufficient, whereas at amounts of thermally pre-treated silicate glass fibers in excess of 5 wt.-%, the delay and/or reduction of shrinkage is not improved further. The optimum amount of thermally pre-treated silicate glass fiber to provide the desired delay and/or reduction of shrinkage silicate glass fibers 0.1 to 1.5 wt.-%.

In the preferred embodiment in which the mineral binder based construction material is a calcium sulfate construction material, the term "stucco" designates calcium sulfate hemihydrate ($CaSO_4 \times \frac{1}{2} H_2O$), which is conventionally used to prepare slurries for calcium sulfate building boards. Stucco is also the basis for calcium sulfate renders or plasters. However, it is not excluded that the stucco may also contain minor amounts of calcium sulfate anhydrite, such as e.g. amounts of less than 20 wt.-% and preferably less than 10 wt.-% (based on the total weight of stucco). The term "gypsum" designates calcium sulfate dihydrate ($CaSO_4 \times 2H_2O$). As noted above, the inventive construction material encompasses both processable/formable mixtures, preferably comprising stucco, and depending on the mixture, possibly also non-bound water, as well as set mineral binders, preferably wherein the calcium sulfate is predominantly present as calcium sulfate dihydrate.

If the calcium sulfate construction material is still processable, the calcium sulfate hemihydrate or stucco is regularly present in amounts of at least 50 wt.-% based on the dry materials used in the calcium sulfate construction material. Preferably, the amount of calcium sulfate is in the range of 60 to 99 wt.-%, even more preferably in the range of 70 to 98 wt.-% and even more preferably in the range of 75 to 95 wt.-%. The method of calcination is not important, and either alpha or beta-calcined stucco is suitable.

Concerning the length of the thermally pre-treated silicate glass fibers, the inventive construction material is not subject to any relevant restrictions, except that the fibers should be sufficiently long to provide the desired stabilization, but should on the other hand not be so long that the fibers interfere with/impede a mixing process, by which the construction material is prepared. As a particularly suitable length, a range of 1 to 20 mm, particularly 2 to 15 mm, more particularly 4 to 13 mm and most particularly 4 to 8 mm can be mentioned.

In addition, the diameter of the thermally pre-treated silicate glass fibers should be such that on the one hand, the fiber is sufficiently resilient and does not break too easily, but on the other hand, the fiber should not be too thick, such that the fibers become too voluminous, to avoid that a large amount of fibers has to be incorporated into the composition to provide sufficient stabilization. In the practice of this invention, fibers with a mean particle diameter in the range of from 1 to 20 μm and preferably 2 to 10 μm can advantageously be used.

For the colloidal silica to be incorporated into the inventive construction material, preferred amounts of 0.01 to 10 wt.-%, based on the total weight of mineral binder, can be mentioned, where an amount colloidal silica of 0.1 to 5 wt.-% is particularly preferred and an amount in the range of 0.3 to 2.0 wt.-% is even more preferred. In this regard, it is noted that while colloidal silica is most often used as a colloidal dispersion in water, the above weight percentages are given for colloidal silica on a dry basis.

In the investigations underlying this invention, it has been found that a lower amount of added colloidal silica (such as 0.4 wt.-%) does not have an impact on the properties of the mixture, when forming the mineral binder based slurry, particularly calcium sulfate slurry, whereas the addition of an amount of e.g. 2 wt.-% had a liquefying effect and the addition of high amounts of colloidal silica (about 4 wt.-%) even had a thickening effect. In addition, at >4 wt.-% the colloidal silica had an accelerating effect on the setting of the mineral binder based slurry. Acceleration was particularly pronounced, if approximately 10 to 15 wt. % colloidal silica was added. Advantageously, thermally pre-treated silicate glass fibers do not influence the mineral binder based slurry properties, such as fluidity, and/or its setting behavior. Thermally pre-treated silicate glass fibers also appear not to influence an optional foam in the slurry, in particular, they appear not to destruct a foam.

Further additives can be incorporated into the inventive construction material to adjust or optimize one or more workability properties and final characteristics thereof. For example, conventional glass fibers can be added to further strengthen the building material, foaming agents can be added to control the density of the set composition, dispersing agents can be added to aid in dispersing the dry materials into the aqueous slurry, organic binders can be added for bonding, e.g. for bonding the liner to the core, and accelerators and retarders can be added for controlling the time necessary for the composition to set. In addition, it is possible to incorporate agents to resist water-degradation of the set construction material, and other fire-resistant additives such as clay, colloidal alumina, feldspar-free muscovite, unexpanded vermiculite, and water-insoluble calcium sulfate anhydrite whisker fibers. Appropriate additives are well known and available to the skilled practitioner.

Preferably, the mineral binder based construction material is devoid of vermiculites.

In accordance with a particularly preferred embodiment of the invention, the inventive construction material can be a board, a brick, render, mortar, filler, joint compound and/or screed.

A building board according to this invention refers to flat sheets used in construction to assemble walls, floors or ceilings. Examples of these building boards or panels include, but are not limited to, wallboard, drywall, plasterboard, fiberboard, cement board, screed board. A building board has two main surfaces, the top and bottom face of the building board. Many construction boards can have liners, which can cover the main surfaces/faces as well as frequently at least two edges. The core of a construction board according to an embodiment of the invention can comprise one or more layers. The construction board can have a core with at least one mineral binder based layer, wherein the mineral binder based layer comprises thermally pre-treated silicate glass fibers and optionally colloidal silica If the core comprises only one layer, this layer comprises thermally pre-treated silicate glass fibers and optionally colloidal silica. If the core comprises more than one layer, at least one layer comprises thermally pre-treated silicate glass fibers and optionally colloidal silica. The fire resistance of a mineral binder based construction board can be increased effectively, if thermally pre-treated silicate glass fibers are incorporated into at least one layer of the core.

A preferred embodiment of the mineral binder based construction board is a calcium sulfate building board, particularly a gypsum plasterboard or a gypsum fiberboard. Alternatively or in addition thereto, the construction material can be a calcium sulfate plaster, render, joint compound or mortar. Plaster or render can be a dry or ready-to-use mixture of mineral binder and additives, which is spread on wall and/or ceilings to form a smooth, hard surface when dried. It is generally used for protective and/or decorative purposes. Prior to application, water can be added to a dry mixture.

In accordance with a particularly preferred embodiment of the invention, the construction material can be a screed. Screed can be a dry mixture of a mineral binder, preferably a calcium sulfate building material. This material can contain further additives and can be mixed with water prior to application.

The fire resistance of a gypsum building plaster or screed can be increased effectively, if thermally pre-treated silicate glass fibers and optionally colloidal silica are incorporated into the dry or ready-to-use mixtures.

A further aspect of the invention is a method for the production of a mineral binder based construction material, comprising the steps of
(i) mixing a mineral binder with water and thermally pre-treated silicate glass fibers to form a mixture,
(ii) shaping a construction material from the mixture, and
(iii) allowing the construction material to set.

The mixture of (i) can optionally comprise colloidal silica.

The construction material prepared according the method described above can be a board, a brick, render, mortar, filler, joint compound and/or a screed.

A yet further aspect of the invention is the use of thermally pre-treated silicate glass fibers and optionally colloidal silica to improve the fire resistance of the mineral binder based construction material compared to a mineral binder based construction material with conventional glass fibers and optionally colloidal silica, but otherwise of identical composition. Preferably, this can prevent fall-off and/or improve a cohesion of construction materials when exposed to high temperature, preferably during a fire.

A further embodiment of the invention is the use of thermally pre-treated silicate glass fibers and optionally colloidal silica in a mineral binder based construction material to delay and/or reduce shrinkage of a test body compared to a mineral binder based construction material with conventional glass fibers and optionally colloidal silica, but otherwise of identical composition when exposed to high temperature, preferably during a fire.

In the above, any preferred or particularly suitable embodiments, which have been described in connection with one aspect, are also applicable to all other aspects of the invention, unless that combination is in clear contradiction to that aspect. Thus, all such combinations are encompassed by and deemed as described in invention, even if this is not explicitly indicated.

In the following, the invention will be illustrated by means of Examples, which should however not be construed as limiting to the scope of the invention in any respect.

EXAMPLES

Example 1: Relative Shrinking Behavior of Gypsum Prisms

For the following tests, prisms (test bodies) with dimensions of 10 cm×4 cm×2 cm were prepared from the compositions as shown in the below Table 1 (all weight percentages are based on the total weight of stucco as reference). The prisms were prepared by premixing stucco, accelerator and thermally pre-treated silicate or conventional glass fibers thoroughly in a bag by shaking. Liquid additives (including colloidal silica, which was used as a 40% aqueous solution) were mixed with the water to be admixed with the dry mixture and the dry components were introduced into the aqueous mixture and stirred until a homogeneous calcium sulfate slurry had formed. Subsequently, the mixture was poured into respective prism forms, from which the prisms were removed after 30 min. The prisms were then dried at 40° C. to a constant weight to provide a density of about 1250 kg/m³.

Suitable commercially available thermally pre-treated silicate glass fibers are those distributed by Fingerhuth HeatProtection as isoTEX® 1200.GS6.T which are based on 95±1 wt. % $SiO_2$ and 3.5±0.5 wt. % $Al_2O_3$ as well as optionally minor amounts (i.e. less than 1 wt.-%) of other components such as $Na_2O$.

TABLE 1

| Sample | Accelerator | Glass fiber[2] | Thermally pre-treated silicate glass fiber (6 mm)[3] | Colloidal silica[4] |
|---|---|---|---|---|
| 1[1] | 0.1% | | | |
| 2[1] | 0.1% | 0.5% | | |
| 3[1] | 0.1% | 1% | | |
| 4 | 0.1% | | 0.5% | |
| 5 | 0.1% | | 1% | |
| 6 | 0.1% | 0.5% | | 1.7% |
| 7 | 0.1% | | 0.5% | 1.7% |

[1] = reference samples;
[2] = glass fibers M 3001/2 of Johns Manville;
[3] = isoTEX ® 1200.GS6.T (Fingerhuth Heatprotection);
[4] = as 40% aqueous colloidal solution;

The shrinking behavior of the thus prepared prisms was investigated by subjecting the prisms to heating according to the standard temperature-time curve as described in DIN EN 1363-1: 2012-10 and maintaining the temperature at 945° C. from 60 min to 120 min. The respective expansion shrinking profiles are shown in the enclosed FIGS. 1 to 3.

Figure 1:
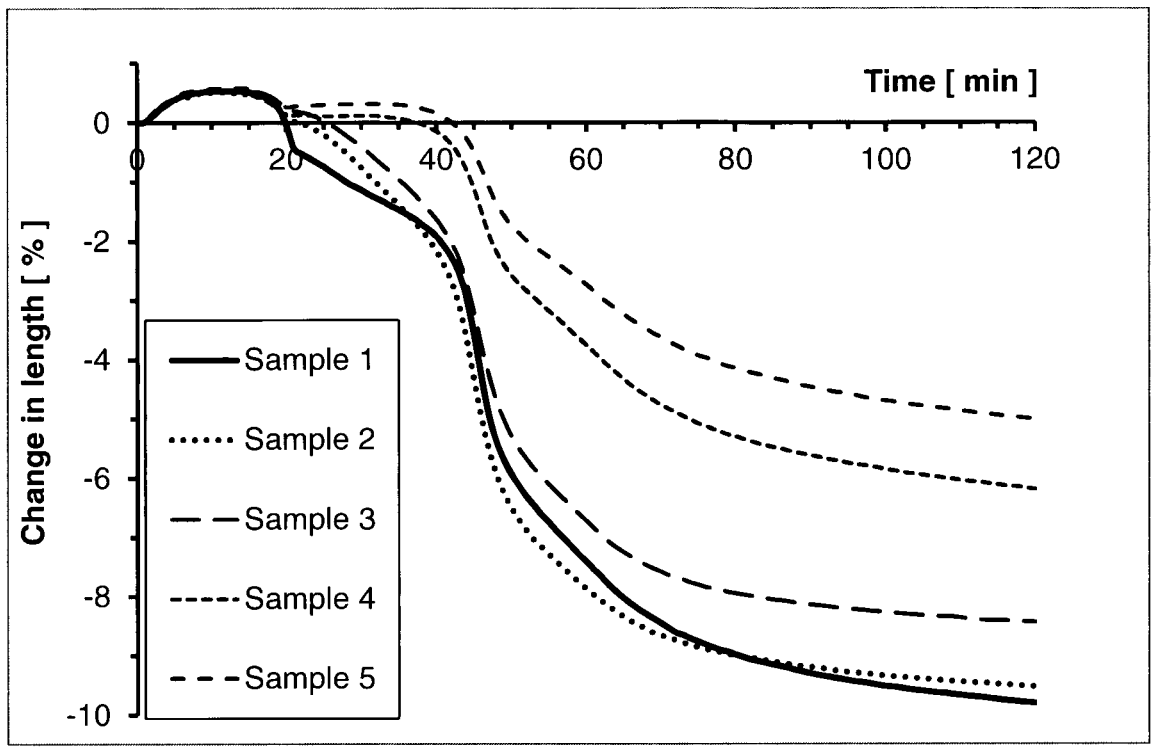
FIG. 1 is a graph of fiber shrinkage length over time.

As is apparent from FIG. 1, the sample without thermally pre-treated silicate or conventional glass fibers (Sample 1) and samples that only contain conventional glass fibers (Samples 2 and 3) all have end shrinkage values of about −8 to −10%. Samples with thermally pre-treated silicate glass fibers (Samples 4 and 5), on the other hand, have end shrinkage values of about −4 to −7%. In all samples, an initial expansion phase until about 20 min can be observed, which is probably due to the evaporation of the crystallization water. Samples without thermally pre-treated silicate glass fibers start shrinking after this initial expansion phase. This shrinkage is delayed in samples with thermally pre-treated silicate glass fibers.

Figure 2:
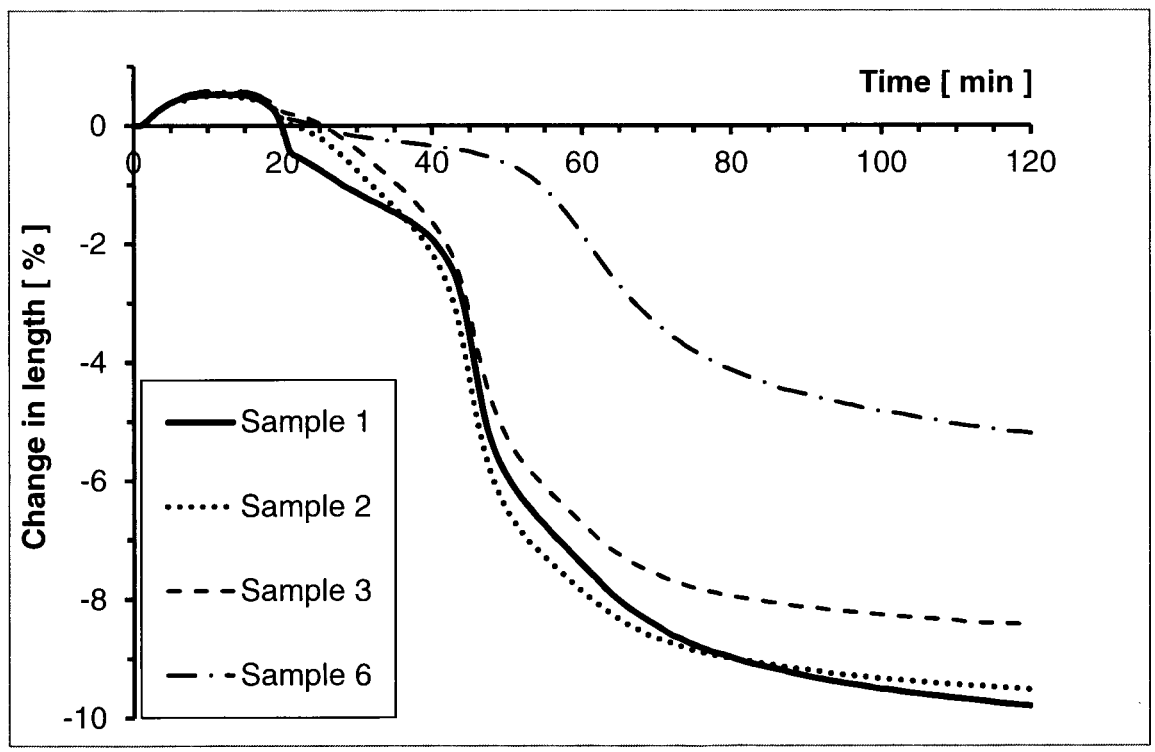
FIG. 2 is a graph of the effect of colloidal silica on fiber shrinkage over time.

FIG. 2 shows the effect of colloidal silica on the shrinking behavior. The colloidal silica has a positive impact on the shrinking behavior as it prevents a rapid decline in the reduction of the length. The addition of colloidal silica resulted in an end shrinkage value of only about −5.2% (Sample 6).

Figure 3:
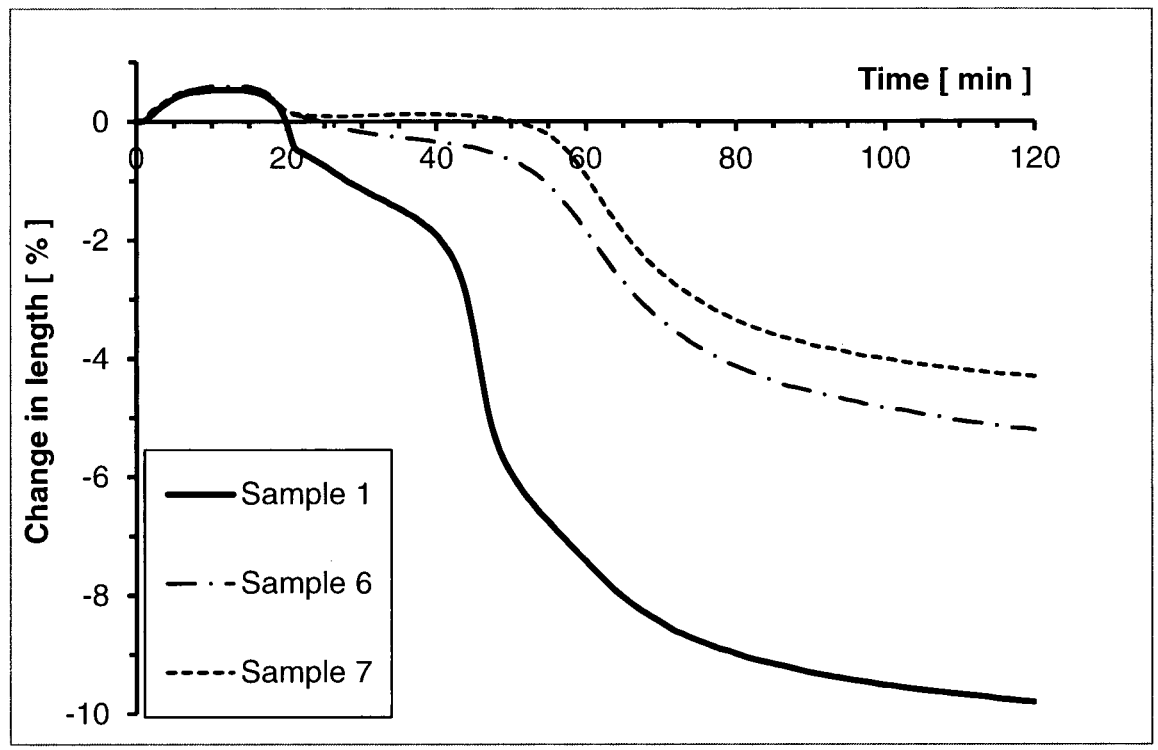
FIG. 3 is a graph of the effect of the addition of thermally pre-treated silicate glass fibers and colloidal silica on fiber shrinkage over time.

In FIG. 3, the combined effect of the addition of thermally pre-treated silicate glass fibers and colloidal silica is shown. In Sample 7 comprising 1.7% colloidal silica and 0.5% thermally pre-treated silicate glass fibers the end shrinkage value was remarkably superior to an almost identical sample in which the thermally pre-treated silicate glass fibers were substituted with conventional glass fibers (Sample 6).

Example 2: Relative Stability in the Hot State

For the determination of the stability in the hot state, porous prisms were used, because non-porous prisms break too easily. Porous prisms, however, do not exhibit any expansion phase.

The test prisms (16 cm×4 cm×2 cm) were prepared by an analogous method as described in Example 1. The mixture of the dry components was introduced into the liquid additive/water admixture and subsequently, foam was added, which had previously been prepared separately. The foam was then mixed into the calcium sulfate slurry for 20 s, and the resulting mixture was poured into the prism molds. After about 10 to 15 min, the prisms were removed from the forms and dried to a constant weight at 40° C. to provide a density of about 850 kg/m³. The composition of the test prisms thus prepared are indicated in Table 2 below.

TABLE 2

| Sample | Accelerator | Glass fiber² | Silicate glass fiber³ (6 mm) | Colloidal silica⁴ | Foam |
|---|---|---|---|---|---|
| 1¹ | 0.1% | | | | |
| 8 | 0.1% | 0.3% | | | 13 g |
| 9 | 0.1% | | 0.3% | | 13 g |
| 10 | 0.1% | 0.5% | | 1% | 13 g |
| 11 | 0.1% | | 0.5% | 1% | 13 g |
| 12 | 0.1% | 0.5% | | 1.7% | 13 g |
| 13 | 0.1% | | 0.5% | 1.7% | 13 g |

Figure 4:
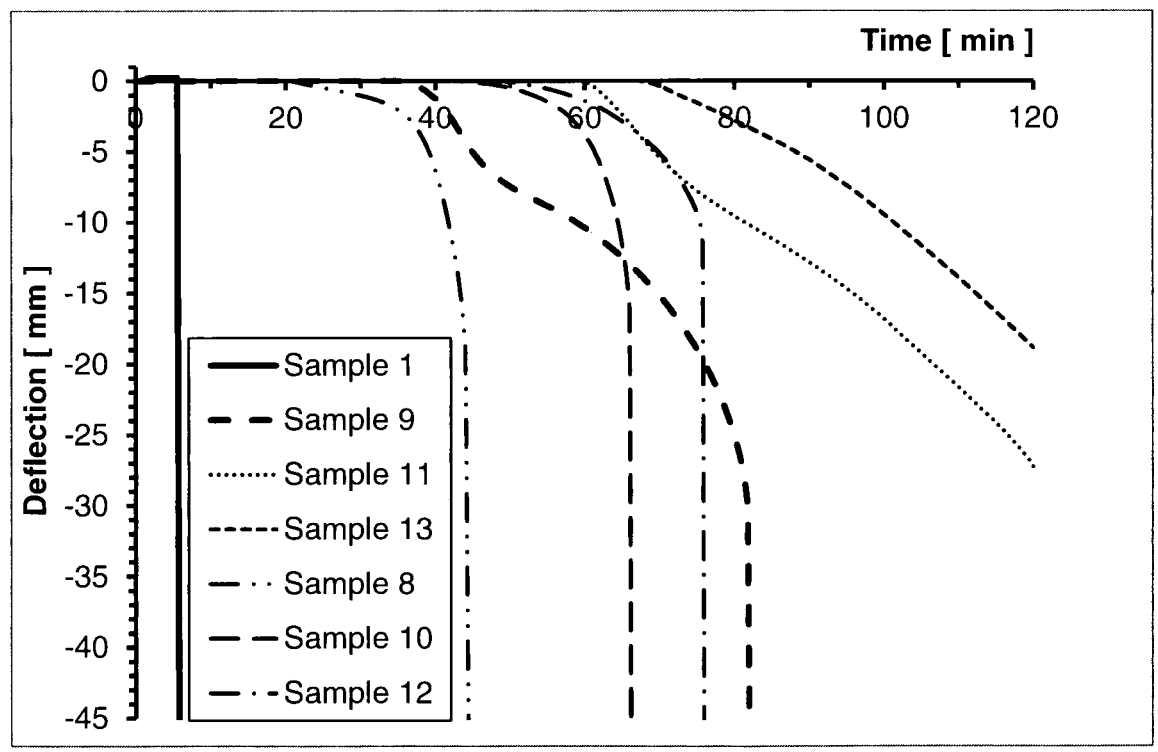
FIG. 4 is a graph of fiber deflection/deformation over time.

¹= reference sample;
²= glass fibers M 3001/2 of Johns Manville;
³= isoTEX ® 1200.GS6.T (Fingerhuth Heatprotection);
⁴= as 40% aqueous colloidal solution The test prisms were subjected to a deflection/deformation test at high temperature as described hereinafter: Two horizontal ceramic tubes were positioned parallel to one another on ceramic supports in an oven chamber. A test prism was placed on the two parallel horizontal ceramic tubes, which were positioned 11 cm apart from one another. To simulate the dead load of a building board, a 200 g weight was positioned in the middle of the prism. The weight of 200 g was transferred onto the prism via a ceramic rod pressing onto a ceramic plate (1 cm×1 cm), which was positioned on the upper surface of the prism. The oven chamber was heated according to the standard temperature-time curve as described in DIN EN 1363-1: 2012-10 and the temperature was maintained at 945° C. from 60 min to 120 min. This time-temperature curve predetermines the course of the temperature during the classification test for fire resistance of structural elements. The deflection of the test prism was measured via the ceramic rod at 15 s intervals. The results of these measurements are shown in FIG. 4.

As is apparent from this figure, gypsum prisms without the addition of any kind of fibers had no stability and broke after about 6 min (Sample 1). Adding conventional glass fibers to the prisms delayed breakage by about 38 min (Sample 8) with breakage occurring after approx. 44 min. Breakage could be delayed further by adding colloidal silica to the conventional glass fiber samples (Samples 10 and 12) with breakage occurring after approx. 66 min (Sample 10) and 76 min (Sample 11). Specifically, the deflection of the sample with 0.3% conventional glass fibers (Sample 8) begins after only 20 min, with 0.5% conventional glass fibers and 1% colloidal silica (Sample 10) after 45 min and with 0.5% glass fibers and 1.7% colloidal silica (Sample 12) after 50 min.

Gypsum prisms with thermally pre-treated silicate glass fibers (Samples 9, 11 and 13) appeared to exhibit more flexibility and were able to resist the strain longer. The sample without colloidal silica (Sample 9) had a similar, although somewhat delayed, breakage after approx. 82 min compared to the sample containing conventional glass fibers and colloidal silica (Sample 12). Both samples containing both thermally pre-treated silicate glass fibers and colloidal silica (Samples 11 and 13) did not fracture during the test run of 120 min. Samples 11 (1.0% colloidal silica) and 13 (1.7% colloidal silica) reached a maximum deflection of 28 mm and 18 mm, respectively. Thus, the samples with thermally pre-treated silicate glass fibers (Samples 9, 11 and 13) differ markedly from those of the conventional glass fiber samples (Samples 8, 10 and 12). The deflection of the sample with 0.3% thermally pre-treated silicate glass fibers (Sample 9) begins after 35 min, with 0.5% thermally pre-treated silicate glass fibers and 1% colloidal silica (Sample 11) after 60 min and with 0.5% thermally pre-treated silicate glass fibers and 1.7% colloidal silica (Sample 13) after 70 min. In addition, the period of time during which the thermally pre-treated silicate glass fiber samples deform and bend is significantly longer than that of the conventional glass fiber samples.

The invention claimed is:

1. A mineral binder based construction material comprising mineral binder, silicate glass fibers and optionally further additives; and the silicate glass fibers are thermally pre-treated silicate glass fibers, wherein:
   the construction material is a board, brick, render, mortar, filler, joint compound or a screed,
   the board has a core with at least one mineral binder based layer, and
   the mineral binder based layer comprises thermally pre-treated silicate glass fibers and colloidal silica.

2. The mineral binder based construction material according to claim 1, characterized in that a thermal pre-treatment of the pre-treated silicate glass fibers comprises the step of heating silicate glass fibers to temperatures between 700° C. to 1000° C.

3. The mineral binder based construction material according to claim 1, characterized in that the construction material further comprises colloidal silica.

4. The mineral binder based construction material according to claim 1, characterized in that a test body thereof has a temporally delayed shrinkage phase, whereby a time interval for the test body to reach 99% of its initial length is at least 1.35 times of the time interval at which a test body with conventional glass fibers and optionally colloidal silica, but otherwise of identical composition, reaches 99% of its initial length when exposed to temperatures according to a standard temperature-time curve as described in DIN EN 1363-1:2012-10 and the temperature was maintained at 945° C. from 60 min to 120 min.

5. The mineral binder based construction material according to claim 1, characterized in that the test body thereof exhibits a smaller shrinkage rate after at least 60 min than a test body comprising conventional glass fibers and optionally colloidal silica, but otherwise of identical composition when exposed to a temperature according to a temperature profile of DIN EN 1363-1:2012-10 for a first 60 min.

6. The mineral binder based construction material according to claim 1, characterized in that it comprises 0.01 to 5 wt.-%, thermally pre-treated silicate glass fibers, based on the total weight of the mineral binder.

7. The mineral binder based construction material according to claim 1, characterized in that it comprises thermally pre-treated silicate glass fibers comprising 90 to 99 wt.-% $SiO_2$ and from 1 to 10 wt.-% $Al_2O_3$ based on the total weight of the fiber.

8. The mineral binder based construction material according to claim 1, characterized in that it comprises thermally pre-treated silicate glass fibers with a length of from 1 to 20 mm.

9. The mineral binder based construction material according to claim 1, characterized in that it comprises thermally pre-treated silicate glass fibers having a mean fiber diameter of from 1 to 20 μm.

10. The mineral binder based construction material according to claim 1, characterized in that it comprises 0.01 to 10 wt.-% of colloidal silica, based on the total weight of the mineral binder.

11. A method for the production of a mineral binder based construction material, comprising the steps of:
   (i) mixing a mineral binder with water and thermally pre-treated silicate glass fibers and optionally other additives to form a mixture,
   (ii) shaping a construction material from the mixture; and
   (iii) allowing the construction material to set, wherein:
      the construction material is a board, brick, render, mortar, filler, joint compound or a screed,
      the board has a core with at least one mineral binder based layer, and
      the mineral binder based layer comprises thermally pre-treated silicate glass fibers and colloidal silica.

\* \* \* \* \*